(12) United States Patent
Yechout

(10) Patent No.: US 8,382,041 B1
(45) Date of Patent: Feb. 26, 2013

(54) RAKELET

(75) Inventor: Thomas R. Yechout, Colorado Springs, CO (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 199 days.

(21) Appl. No.: 12/849,849

(22) Filed: Aug. 4, 2010

(51) Int. Cl.
*B64C 23/00* (2006.01)

(52) U.S. Cl. .................... 244/199.4; 244/198; 244/199.2

(58) Field of Classification Search ................... 244/198, 244/199.2, 199.4; 114/39.15, 39.24, 55.54, 114/274
See application file for complete search history.

(56) References Cited

U.S. PATENT DOCUMENTS

| | | | |
|---|---|---|---|
| 4,108,403 A | 8/1978 | Finch | |
| 4,190,219 A | 2/1980 | Hackett | |
| 4,245,804 A | 1/1981 | Ishimitsu et al. | |
| 4,457,479 A | 7/1984 | Daude | |
| 4,545,552 A | 10/1985 | Welles | |
| 4,714,215 A | 12/1987 | Jupp et al. | |
| 5,275,358 A | 1/1994 | Goldhammer et al. | |
| 5,348,253 A | 9/1994 | Gratzer | |
| 5,634,613 A | 6/1997 | McCarthy | |
| 6,089,502 A | 7/2000 | Herrick et al. | |
| 6,484,968 B2 | 11/2002 | Felker | |
| D488,765 S | 4/2004 | Boren | |
| 7,275,722 B2 | 10/2007 | Irving et al. | |
| 2007/0018049 A1 * | 1/2007 | Stuhr | 244/124 |
| 2007/0252031 A1 | 11/2007 | Hackett et al. | |

OTHER PUBLICATIONS

L. Montoya, "KC-135 Winglet Flight Results", NASA Dryden Flight Research Center, pp. 145-156.
C. Kuo et al., "Adaptive Winglet Design, Analysis and Optimisation of the Cant Angle for Enhanced MAV Performance".

\* cited by examiner

*Primary Examiner* — Timothy D Collins
*Assistant Examiner* — Nicholas McFall
(74) *Attorney, Agent, or Firm* — AFMCLO/JAZ; Fredric Sinder

(57) ABSTRACT

A rakelet comprises a raked portion and a winglet portion that selectively integrate features of raked wingtips and winglets into a wingtip device that improves aircraft endurance and range over standard wings and over other wingtip devices such as raked wings, winglets, and the like. The features of the rakelet can be configured to improve and maximize the range and endurance for any particular aircraft.

6 Claims, 6 Drawing Sheets

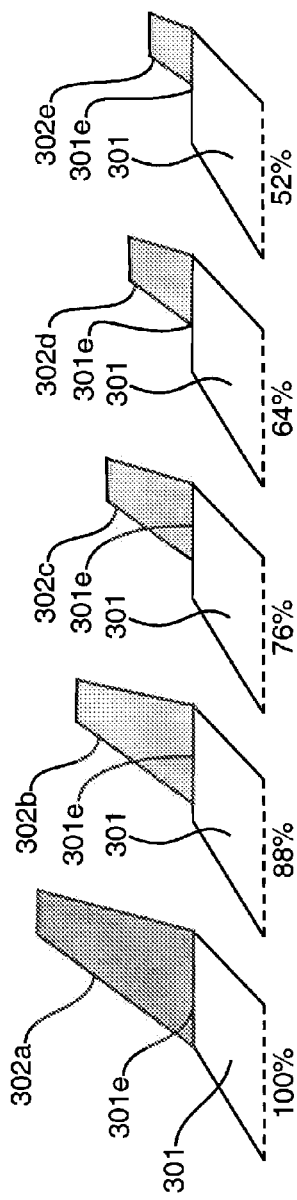
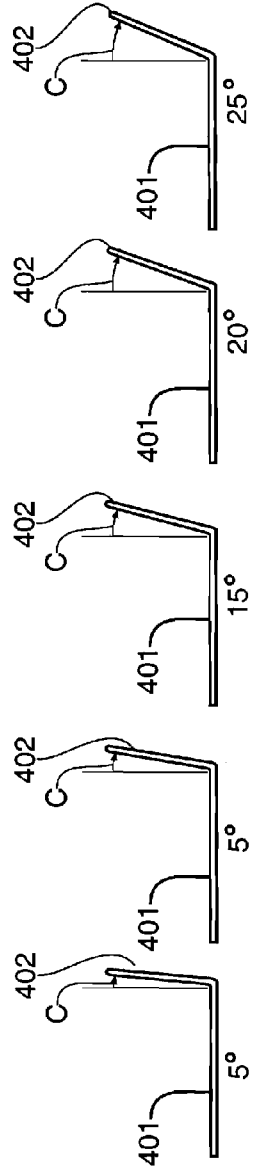
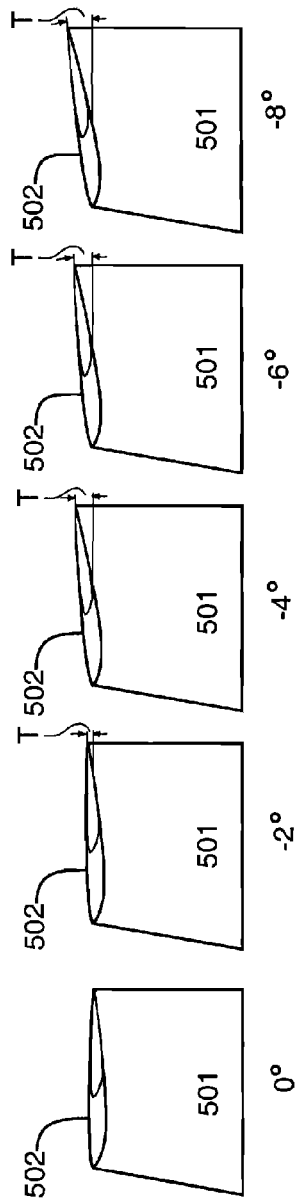

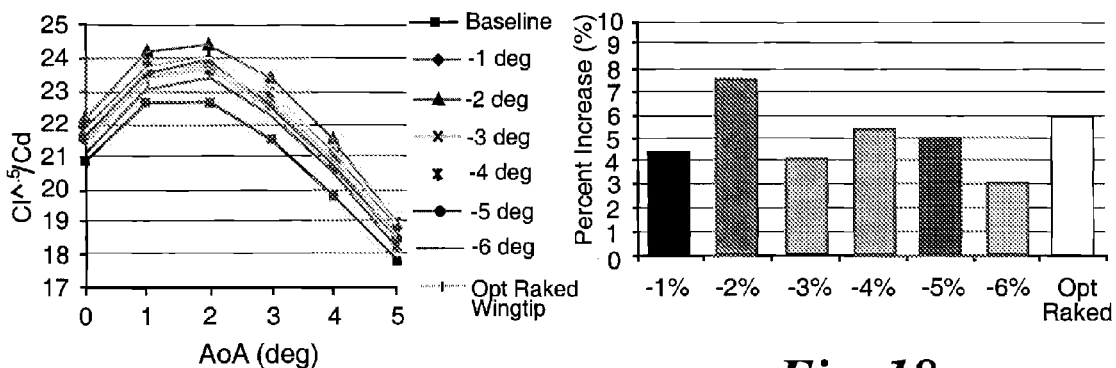
*Fig. 17*
*Fig. 18*
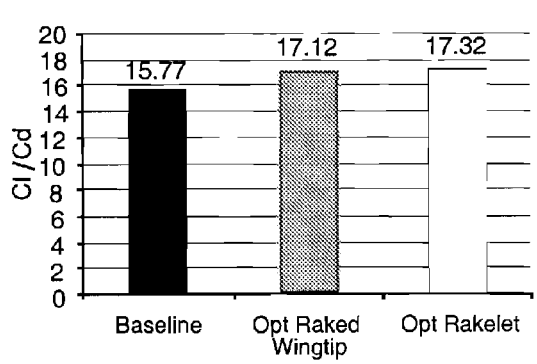
*Fig. 19*
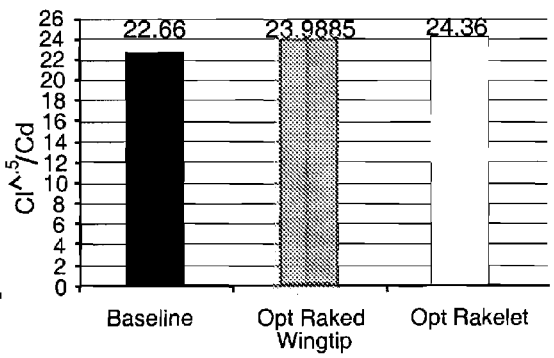
*Fig. 20*

RAKELET

RIGHTS OF THE GOVERNMENT

The invention described herein may be manufactured and used by or for the Government of the United States for all governmental purposes without the payment of any royalty.

TECHNICAL FIELD

This application discloses aircraft wingtips that improve endurance, range, and performance over standard aircraft wings and other wingtip devices.

BACKGROUND

Wingtip devices modify the airflow around an aircraft's wingtip to improve the aerodynamic efficiency of the wing. Wingtip devices can improve the aerodynamic capabilities of an aircraft by reducing the effect of wingtip vortices. Wingtip vortices are created when high pressure air below the wing migrates around the wingtip to the low pressure regions above the wing. This phenomenon causes high speed, low pressure regions of rotational flow around the wingtip that drains energy from the aircraft in the form of induced drag. Conventional wingtips produce strong vortices that can account for more than half of aircraft drag in cruise flight and even more in other flight conditions.

Aircraft wings can be modified to try to improve performance. One wingtip device is a winglet. Winglets are configured as near-vertical airfoils and positioned at each end of an aircraft's standard wingtip. Winglets may be configured in an up, down, or up and down configuration, or they may be blended into a wing. If properly designed, winglets can reduce the strength of wingtip vortices and thereby reduce induced drag.

Another wingtip device is a raked wingtip. Raked wingtips are positioned near the tip of the wing. Raked wingtips provide an area of localized increase in wing sweep. If properly designed, they can improve aircraft performance by increasing a wing's aspect ratio and reducing the wingtip chord. Although raked wingtips reduce drag, they increase the weight of the wing so any reduction in drag must be balanced against the increased weight of the wing. They do not create interference drag because they are in the same plane as the wing, but they generally add more moment to a wing than winglets. In addition, raked wingtips increase wing span, which presents challenges for ground handling, parking, and hanger storage.

Other wingtip devices include wing tip fences, planar wing extensions, blended winglets, and spiroids. These devices are mounted in the region of the wingtip. Although these wingtip devices can reduce the strength of wingtip vortexes and drag, further improvements are needed to improve fuel efficiency and aircraft performance.

SUMMARY OF INVENTION

Rakelets improve endurance and range over standard aircraft wings and over other wingtip devices such as raked wingtips and winglets. They integrate features of raked wingtips and winglets into a wingtip device that exploits the advantages of raked wingtips or winglets over each wingtip device employed separately. Rakelets reduce induced drag and wingtip vortex strength and improve lift over standard wings and other wingtip devices. They can be configured to maximize endurance and range for an aircraft thereby improving fuel efficiency and performance over the baseline performance of the aircraft, and also over range and endurance improvements provided by other wingtip devices such as raked wingtips and winglets.

A rakelet wingtip device for an aircraft comprises a raked portion having an airfoil-shaped cross section, a proximal end, a distal end forming a wingtip chord, an upper surface, a lower surface, a leading edge, and a trailing edge, wherein the proximal end can be attached to a distal end of an aircraft wing and the leading edge and/or the trailing edge has a sweep angle greater than a sweep angle of a corresponding leading or trailing edge of the aircraft wing; and a winglet portion having an airfoil-shaped cross section, a proximal end, a distal end, an upper surface, a lower surface, a cant angle, and a toe angle, wherein the proximal end is attached to the wingtip chord of the raked portion at a cant angle and toe angle that increase endurance and range of the aircraft over a baseline endurance and range of the aircraft.

A method of designing a rakelet comprising a raked portion and a winglet portion to improve endurance and range of an aircraft comprising selecting a sweep angle for the raked portion that maximizes range and endurance ratios of the rakelet; selecting a size and planform for the winglet portion that maximizes endurance and range ratios of the rakelet; selecting a cant angle for the winglet portion that maximizes endurance and range ratios of the rakelet; and selecting a toe-out angle for the winglet portion that maximizes endurance and range ratios of the rakelet.

A rakelet comprises a raked portion having a planform, an airfoil-shaped cross section, a leading edge, a trailing edge and a wingtip chord; and a winglet portion having a planform, an airfoil-shaped cross-section, a leading edge, a trailing edge, a root chord, wherein the root chord of the winglet portion is attached to the wingtip chord of the raked portion at a selected cant angle and toe angle and further wherein the raked portion planform, leading edge, and trailing edge and the winglet portion planform, leading edge, trailing edge, cant angle, and toe angle are selected to maximize the endurance and range of an aircraft to which the rakelet is attached.

BRIEF DESCRIPTION OF THE DRAWINGS

FIG. 1b is a front view of the rakelet of FIG. 1a.

FIG. 1c is a side view of the rakelet of FIG. 1a.

FIG. 2b is a front view of the rakelet of FIG. 2a.

FIG. 2c is a side view of the rakelet of FIG. 2a.

FIGS. 3a-3e are side perspective views of rakelets with different winglet portions.

FIGS. 4a-4e are front views of rakelets with winglet portions at different cant angles.

FIGS. 5a-5e are plan views of rakelets with winglet portions at different toe-out angles.

FIG. 17 shows range ratios for rakelets with different toe-out angles at different angles of attack.

FIG. 18 compares the percentage increase in range ratios of rakelets with different toe-out angles to the range ratio of a standard KC-135 wing at 2° angle of attack.

FIG. 19 compares the endurance ratios of a standard KC-135 wing, an optimized raked wingtip, and an optimized rakelet.

FIG. 20 compares the range ratios of a standard KC-135 wing, an optimized raked wingtip, and an optimized rakelet.

DETAILED DESCRIPTION

Figure 2A:
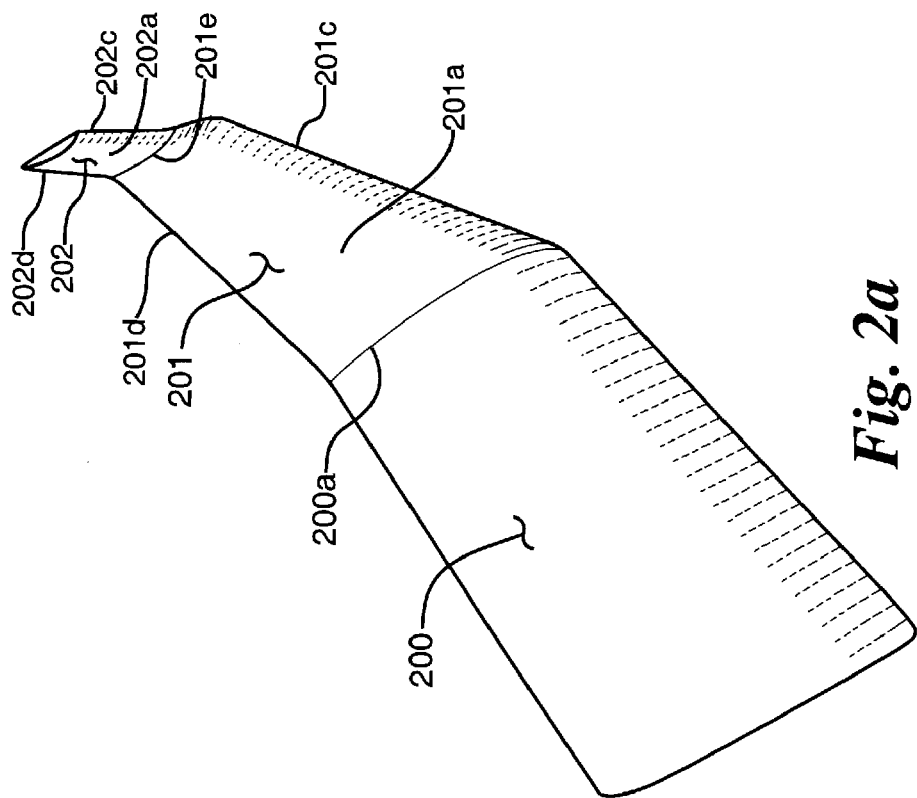
FIG. 2a is a top perspective view of another rakelet.
Figure 1A:
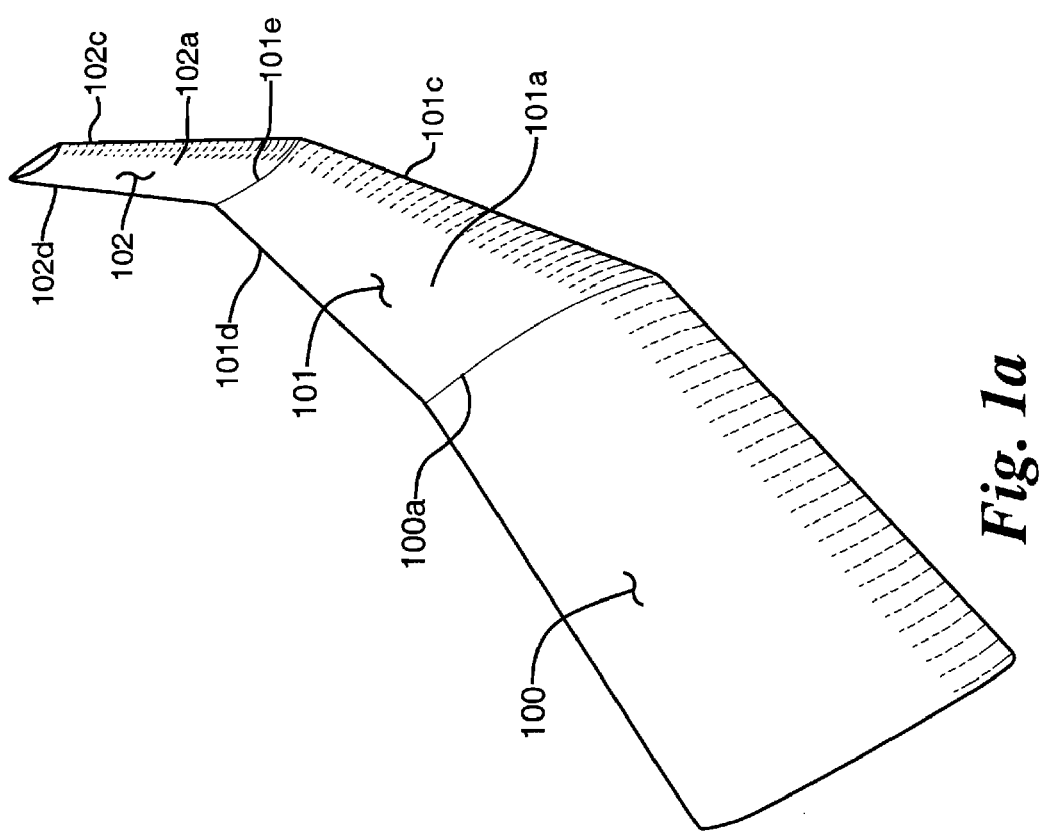
FIG. 1a is a top perspective view of a rakelet attached to a standard wing.

As shown in FIGS. 1 and 2, a rakelet is positioned on a distal portion of an aircraft wing 100, 200. The rakelet comprises a raked portion 101, 201 and a winglet portion 102, 202. The raked portion 101, 201 has an airfoil-shaped cross section that generates lift across it. The raked portion 101, 201 comprises a curved upper surface 101a, 201a, a generally planar lower surface 101b, 201b, a leading edge 101c, 201c, and a trailing edge 101d, 201d. The raked portion 101, 201 can be connected along the wingtip chord 100a, 200a of a standard aircraft wing 100, 200. The leading edge 101c, 201c and/or the trailing edge 101d, 201d of the raked portion 101, 201 may have a sweep angle greater than the sweep of the wing 100, 200 to which the rakelet is attached, as shown in FIGS. 1a and 2a.

Figure 1C:
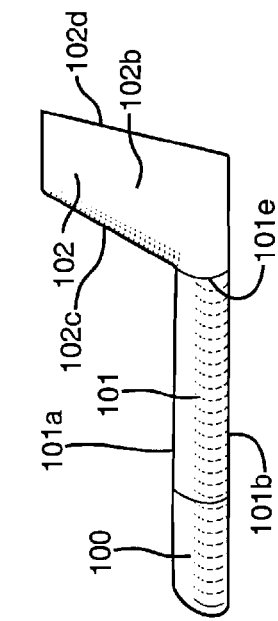
Figure 2C:
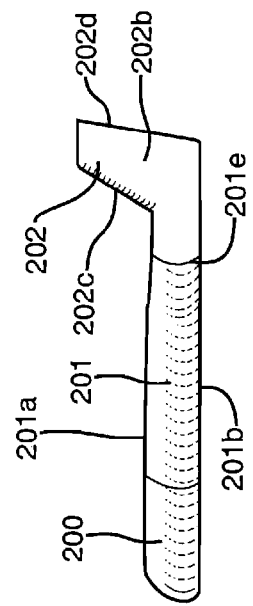
Figure 1B:
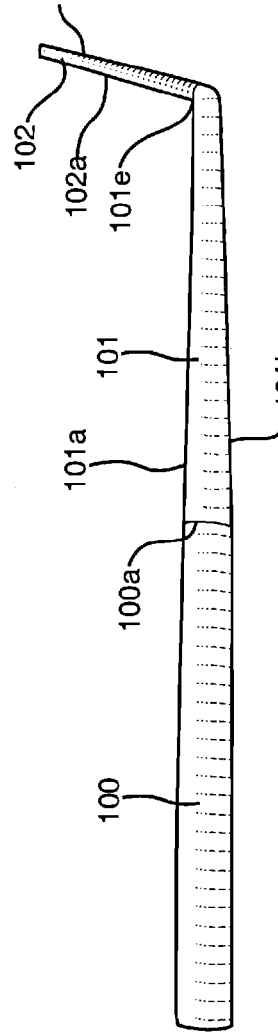
Figure 2B:
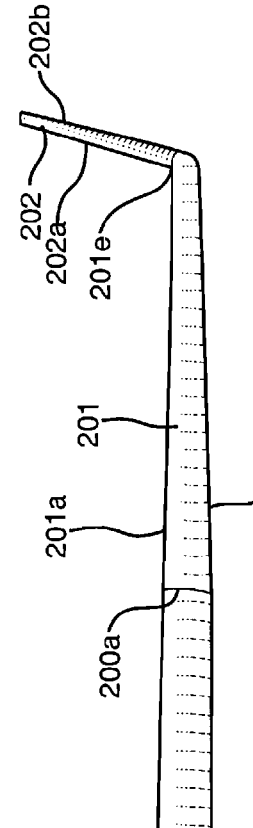

The winglet portion 102, 202 has an airfoil-shaped cross-section that generates lift across it. The winglet portion 102, 202 comprises a curved upper surface 102a, 202a and a generally planar lower surface 102b, 202b, a leading edge 102c, 202c, and a trailing edge 102d, 202d. The leading edge 102c, 202c and the trailing edge 102d, 202d of the winglet portion 102, 202 may include a sweep angle, as desired. The winglet portion 102, 202 is connected at a distal end of the raked portion 101, 201 along the wingtip chord 101e, 202e of the raked portion 101, 201. The winglet portion 102 may be connected along the entire wingtip chord 101e of the raked portion 101, as shown in FIGS. 1a-1c. The winglet portion 202 may be connected to less than the entire wingtip chord 201e of the raked portion 201, as shown in FIGS. 2a-2c, or it may extend beyond the wingtip chord of the raked portion.

The winglet portion 302a, 302b, 302c, 302d, 302e may be connected to any portion of the raked portion 301, such as for example 100%, 88%, 76%, 64%, or 52% of the wingtip chord 301e of the raked portion 301, as shown in FIGS. 3a-3e, or it may extend along another portion of the wingtip chord 301e of the raked portion 301 to maximize range and endurance of an aircraft. The planform of the winglet portion 302a, 302b, 302c, 302d, 302e is sized to the length of the wingtip chord 301e of the raked portion 301 to which it is connected and generally decreases as the winglet portion 302a, 302b, 302c, 302d, 302e is connected to smaller portions of the wingtip chord 301e of the raked portion 301. The winglet portion may exceed the wingtip chord 301e of the raked portion 301 by extending along 110%, 120%, or 130% of the wingtip chord 301e, or another length exceeding the wingtip chord 301e of the raked portion 301. Although a larger winglet portion can reduce the strength of wingtip vortices, it increases the parasitic drag and weight of the wing. Such tradeoffs must be accounted for in designing rakelets for a particular aircraft, as discussed in more detail below.

The cant angle C of the winglet portion 402 may be varied, as desired, to improve the performance of the rakelet for a particular aircraft. The cant angle C is the angle formed by the winglet portion 402 and a vertical line extending perpendicularly from the upper surface of the raked portion 401. The cant angle C may be any desired angle such as 5°, 10°, 15°, 20°, or 25°, as illustrated in FIGS. 4a-4e, or another angle that optimizes range and endurance for a particular aircraft. Different cant angles alter the extent to which the vortex is reduced. They also change the angle of attack of the winglet portion of the rakelet and the lift and force components generated by the winglet portion. These tradeoffs must be accounted for in designing rakelets for a particular aircraft, as discussed in more detail below.

The toe angle T of the winglet portion 502 may be varied to improve range and endurance of the rakelet for particular aircraft. The toe angle T is the angle formed between the winglet portion 502 and the freestream velocity flowing over the raked portion 501 and the wing. Changes in toe angle alter the angle of attack of the winglet portion with respect to the wind from the vortex flowing over the rakelet. The toe angle may be a toe-in or a toe-out angle. Toe-out angles of 0°, −2°, −4°, −6°, and −8°, are illustrated in FIG. 5. However, other toe-out angles or toe-in angles may be selected to improve and maximize range, endurance, and other performance characteristics of an aircraft, as discussed in more detail below.

Figure 6:
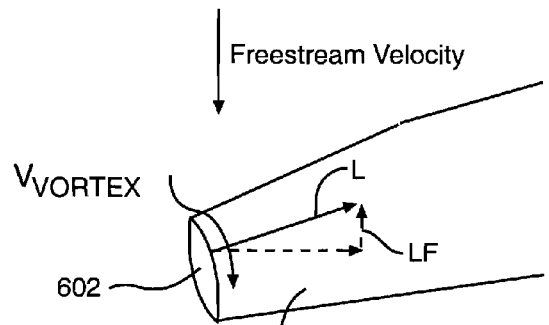
FIG. 6 illustrates a lift vector generated by a rakelet.

The winglet portion 602 intersects the vortex flow $V_{vortex}$ from the raked portion and creates an angle of attack with the vortex flow $V_{vortex}$. As shown in FIG. 6, the winglet portion 602 generates a lift vector L along the raked portion 601 of the rakelet. The lift vector L is perpendicular to the relative flow of the vortex $V_{vortex}$ along the winglet portion 602. The lift vector L has a component that acts in the forward direction $L_F$. This enables the winglet portion 602 to counteract some of the parasitic drag that results from placing the winglet portion 602 in the vortex flow.

Rakelets can be configured through a multi-phase process to improve the baseline endurance and range of a particular aircraft over a standard wing configuration and compared to other wingtip devices such as raked wings and winglets. This multi-phase process is described in reference to a KC-135 tanker. However, it can be used for rakelets that improve range, endurance, and other characteristics of any aircraft over baseline performance and over what can be achieved by other wingtip devices such as raked wings or winglets. Scaled models of an aircraft may be used in wind tunnels and the like to determine a rakelet configuration that optimizes the range and endurance of a particular aircraft. For the KC-135 rakelet, a 1/76 scale model was employed in a wind tunnel to design a rakelet that increased range and endurance over a standard KC-135 wing, and over a standard KC-135 wing modified with just a raked wing or a winglet configuration separately. Different rakelet configurations were generated by stereo lithography and connected to the wingtip chord of a standard KC-135 wing. Other suitable methods may be employed to make rakelets.

During the first phase of a rakelet design, the raked portion is configured to maximize endurance and range ratios of the wing according to Breguet's endurance and range equations, which provide the primary aerodynamic parameters for endurance and range of an aircraft. The formula for Breguet's Endurance Equation is:

$$\text{Endurance} = \frac{1}{TSFC}\left(\frac{C_L}{C_D}\right)\ln\frac{W_0}{W_1}$$

If $C_L/C_D$ is maximized, the endurance of the aircraft can be maximized. The formula for Breguet's Range Equation is:

$$\text{Range} = \sqrt{\frac{2}{\rho_\infty S}}\left(\frac{2}{TSFC}\right)\left(\frac{C_L^{\frac{1}{2}}}{C_D}\right)(\sqrt{W_0} - \sqrt{W_1})$$

If $C_L^{1/2}/C_D$ is maximized, the range of the aircraft can be maximized.

The nominal raked portion planform can be selected by testing different raked wingtip planforms on an aircraft. The raked wingtip planform yielding the greatest increase in endurance and range over the baseline endurance and range of an aircraft is used as the nominal planform. During this process, the dimensions, leading edge sweep, trailing edge sweep, and wingtip chord of each raked wingtip are adjusted and tested to identify the raked wingtip planform that provided the greatest increase in range and endurance over a standard aircraft wing. If increases to the wingspan of the aircraft are a consideration, the raked portion may be designed so overall wingspan of the aircraft is not increased by addition of the raked portion of the rakelet. For example, the sweep of the leading edge and/or trailing edge may be increased or adjusted to maintain the rakelet within the original wingspan of the aircraft. The planform of the raked portion could be based on an optimized rakelet design from a previous design process. The planform of the raked portion can be derived in other ways that identify a planform that increases endurance and range over the baseline endurance and range of a standard aircraft wing and preferably that maximizes that increase.

For the KC-135 design, the planform of the raked portion was based on a raked wingtip that provided the greatest increase in endurance and range for a KC-135. The raked wingtip had an additional 20° leading edge sweep with no additional trailing edge sweep. This planform increased the endurance ratio ($C_L/C_D$) of the KC-135 by 8.32% and it increased the range ratio ($C_L^{1/2}/C_D$) by 4.69% according to Breguet's equations. It also increased the wingspan of the KC-135 by 9.7%. This planform became the nominal planform for the raked portion of the KC-135 rakelet.

After configuring the raked portion of the rakelet, the winglet portion is configured to maximize endurance and range. In the KC-135 study, the nominal planform of the winglet portion was a winglet that provided the maximum increase in endurance and range for a KC-135. The winglet planform had a leading edge sweep of approximately 35°, a height approximately equal to the wingtip chord of a standard KC-135 wing, a root chord that was 65% of the KC-135 wingtip chord, a 15° cant angle and a toe-out angle of −4°. This nominal winglet planform was integrated with the nominal raked portion planform to produce a rakelet planform used in subsequent phases of the KC-135 rakelet design. The nominal rakelet planform then underwent the following process to determine a final rakelet configuration that provided the greatest increase in endurance and range for a KC-135 over its baseline characteristics.

Figure 7:
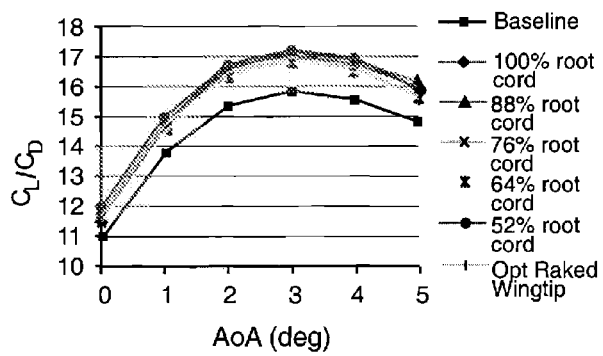
FIG. 7 shows endurance ratios of different size rakelets at different angles of attack.
Figure 8:
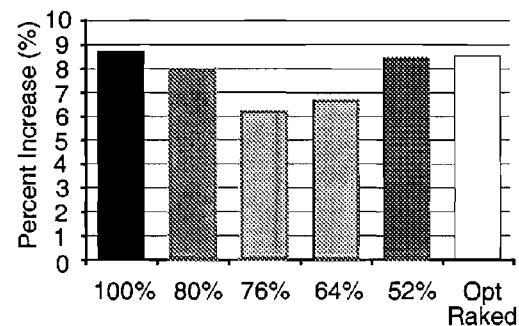
FIG. 8 compares the increase in endurance ratios of different size rakelets to the endurance ratio of a standard KC-135 wing at 3° angle of attack.

The first step in the process involved determining the size of the winglet portion that maximized range and endurance ratios for the rakelet on a KC-135. The size of the winglet portion was varied to determine the size that produced the greatest increase in the endurance ratio ($C_L/C_D$). Winglet portions that were 52%, 64%, 76%, 88%, and 100% of the wingtip chord of the raked portion were tested. Lift and drag coefficients were calculated for each configuration at 0.4 Mach and six different angles of attack ranging from 0° to 5°. Endurance ratios were plotted against different angles of attack to determine the winglet portion size that yielded the greatest increase in endurance for the rakelet. As shown in FIG. 7, all winglet portion sizes improved endurance over a standard KC-135 wing. The maximum endurance ratio occurred at 3° angle of attack for all sizes of winglet portion. The improvement in endurance of each different winglet portion size compared to the standard KC-135 wing at 3° angle of attack was plotted on a bar chart shown in FIG. 8. The winglet portion that was 100% of the wingtip chord of the raked portion provided the greatest increase in endurance. It increased endurance by 8.7% over the baseline endurance of a standard KC-135 wing.

It outperformed all other winglet sizes, and an optimized raked wingtip. The winglet portion that was 52% of the chord of the raked portion provided the next best improvement in endurance.

Figure 9:
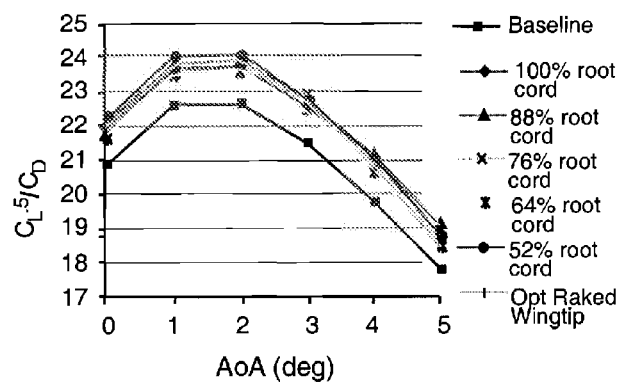
FIG. 9 shows range ratios of different size rakelets over different angles of attack.
Figure 10:
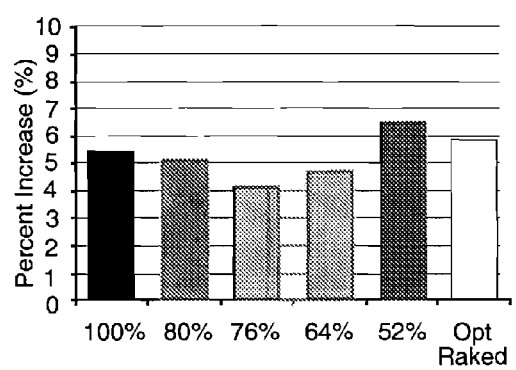
FIG. 10 compares the increase in range ratios of different size rakelets to the range ratio of a standard KC-135 wing at 2° angle of attack.

After endurance was calculated for different sizes of winglet portion, the range ratio ($C_L^{1/2}/C_D$), was calculated for each winglet portion size. These range ratios were plotted against different angles of attack to determine the winglet portion size that yielded the greatest range. Once again all winglet portion sizes improved range over a standard KC-135 wing, as shown in FIG. 9. The maximum increase in range occurred at 2° for all sizes of winglet portion. The improvement in range for each configuration over a standard KC-135 wing at 2° angle of attack is shown in a bar chart in FIG. 10. The winglet portion that was 52% of the wingtip chord of the raked portion produced the greatest increase in range while the winglet portion that was 100% of the wingtip chord of the raked portion provided the second best range improvement. The 52% winglet portion increased range by 6.5% over a standard KC-135 wing, and it outperformed an optimized raked wingtip. The 100% winglet portion provided the second best range increase, but did not increase range as much as an optimized raked wingtip. Although the 52% winglet portion increased range the most over the baseline, the 100% winglet portion was selected for the next phase because it produced the best endurance increase and its configuration was more conducive to varying cant and toe angles in the subsequent phases. If desired, the 52% winglet portion could be used in subsequent design phases to determine the extent to which it can improve the range and endurance ratios of a KC-135 aircraft at different cant and toe angles.

Figure 11:
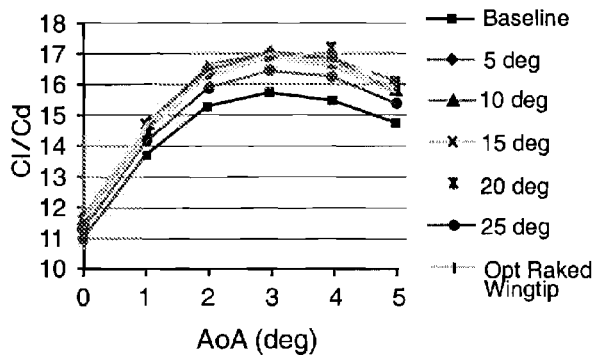
FIG. 11 shows endurance ratios of rakelets with different cant angles at different angles of attack.
Figure 12:
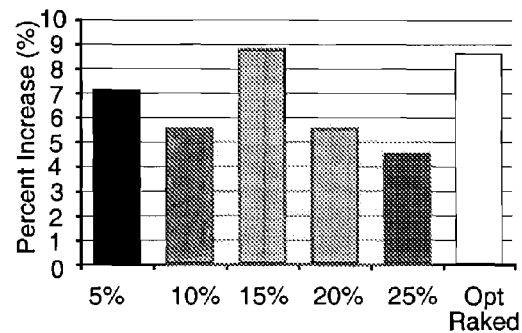
FIG. 12 compares the increase in endurance ratios of rakelets with different cant angles to the endurance ratio of a standard KC-135 wing at 3° angle of attack.

In the next phase, the cant angle of the winglet portion of the rakelet was varied. Rakelets with a 15° leading edge sweep raked portion and a 100% winglet size were used to determine the cant angle that yielded the greatest increase in endurance and range over a standard KC-135 wing. Range and endurance ratios were calculated for rakelets with winglet portions at cant angles of 5°, 10°, 15°, 20°, and 25° under the same wind tunnel conditions of 0.4 Mach and six angles of attack of 0° to 5° as in the previous phase. The maximum increase in endurance occurred at 3° angle of attack for all cant angles and all cant angles outperformed the standard KC-135 wing design, as shown in FIG. 11. FIG. 12 shows the improvements in endurance of each of these rakelets compared to a standard KC-135 wing configuration at 3° angle of attack. The rakelet with a winglet portion at a 15° cant angle provided the greatest increase in endurance compared to other rakelet configurations, and it outperformed an optimized raked wingtip. It increased the endurance ratio by 7.85% over the baseline endurance of a standard KC-135 wing.

Figure 13:
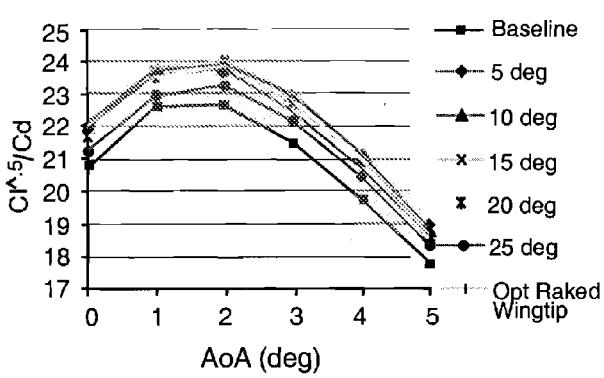
FIG. 13 shows range ratios of rakelets with different cant angles at different angles of attack.
Figure 14:
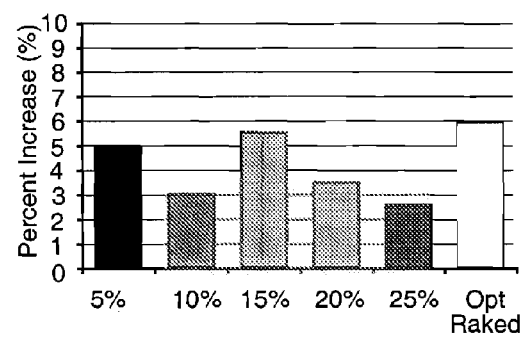
FIG. 14 compares the increase in range ratios of rakelets with different cant angles to the range ratio of a standard KC-135 wing at 2° angle of attack.

Next, range ratios were calculated for each cant angle at different angles of attack to determine the winglet portion cant angle that yielded the greatest increase in range for the rakelet. As shown in FIG. 13, the maximum range ratio was found at 2° angle of attack for all rakelets and all rakelets outperformed the standard KC-135 wing configuration. FIG. 14 shows the improvement in range that each rakelet provided over the baseline range of a standard KC-135 wing at 2° angle of attack. The rakelet with a winglet portion at a 15° cant angle outperformed all other rakelets. It increased range by 5.6% over the baseline range of a standard KC-135 wing. However, it did not increase the range quite as much as an optimized raked wingtip.

Figure 15:
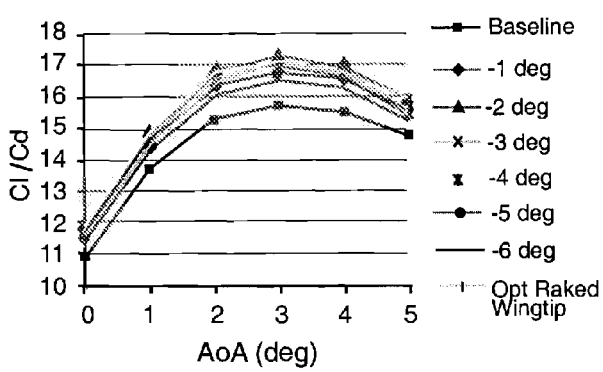
FIG. 15 shows endurance ratios of rakelets with different toe-out angles at different angles of attack.
Figure 16:
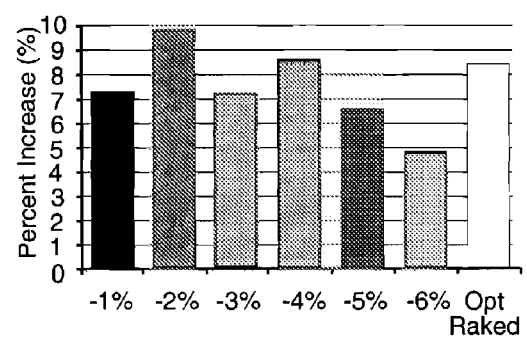
FIG. 16 compares the percentage increase in endurance ratios of rakelets with different toe-out angles to the endurance ratio of a standard KC-135 wing at 3° angle of attack.

In the next phase, the winglet portion toe angle was varied to determine the toe angle that provided the greatest improvement to endurance and range. Range and endurance ratios were calculated for toe-out angles of 0°, −2°, −4°, −6°, and −8° at 0.4 Mach and angles of attack of 0° to 5° as in the previous phases. The maximum endurance ratio was achieved at 3° angle of attack for all rakelets and all rakelets improved endurance over the baseline endurance of a standard KC-135 wing, as shown in FIG. 15. The improvements in endurance of each rakelet compared to the baseline endurance of a standard KC-135 wing at 3° angle of attack were plotted on a bar chart shown in FIG. 16. The rakelet with a −2° toe-out angle provided the greatest increase in the endurance ratio. It outperformed all other rakelets and it outperformed an optimized raked wingtip. It increased endurance by 9.85% over a standard KC-135 wing.

Range ratios were then determined for each toe-out angle to identify the toe-out angle that yielded the maximum increase in range. As shown in FIG. 17, the maximum range increase occurred at 2° angle of attack for all toe-out angles and all rakelets outperformed a standard KC-135 wing. The improvements in range for each toe-out angle compared to a standard KC-135 wing were graphed in a bar chart shown in FIG. 18. The rakelet with a −2° toe-out configuration of the winglet portion provided the greatest increase in range over the baseline range of a KC-135. It outperformed all other toe-out angles and it outperformed the optimized raked wingtip. It increased range by 7.51% over the baseline range of a standard KC-135 wing.

As a result of the foregoing process, a rakelet comprising a raked portion with a 15° leading edge sweep, a winglet portion extending along 100% of the chord length of the raked portion at a 15° cant angle, and having a −2° toe-out angle was identified as providing the greatest improvement in range and endurance over the baseline range and endurance of a standard KC-135 wing. This optimized rakelet outperformed not only a standard KC-135 wing, it also outperformed an optimized raked wingtip. As shown in FIG. 19, the baseline endurance ratio of a standard KC-135 wing is 15.77. An optimized raked wingtip has an endurance ratio of 17.12, which represents an 8.54% increase over the baseline KC-135 endurance. The optimized rakelet had an endurance ratio of 17.32, which represents a 9.85% improvement over the baseline endurance ratio of a standard KC-135 wing and a 1.17% increase in endurance over a raked wingtip optimized for a KC-135. As shown in FIG. 20, the optimized rakelet had a range ratio of 24.36, which represents a 7.51% increase over the 22.66 baseline range of a standard KC-135 wing. This range ratio also exceeded the 23.99 range ratio of an optimized raked wingtip by 1.54%. Thus, the rakelet configured through the disclosed multi-phase process improved endurance and range over a baseline KC-135 standard wing and over an optimized raked wingtip. If the entire fleet of KC-135 tankers were outfitted with this rakelet, improvements in range and endurance could yield savings of approximately $34 million per year in fuel costs depending on fuel prices and mission requirements. Similar improvements can be expected by designing rakelets for other aircraft according to the process disclosed herein. Properly-designed rakelets provide the greatest improvement in endurance and range for aircraft compared to baseline characteristics and compared to other wingtip devices that are optimized for the aircraft.

The foregoing disclosure has been presented for purposes of illustration and description and is not intended to be exhaustive or to limit the disclosure to the devices, systems, methods, and forms disclosed herein. Persons skilled in the art will realize and appreciate that many modifications and variations are possible in light of the above teaching. Although the process of designing rakelets to maximize endurance and range was illustrated for the KC-135, the process can be applied to any aircraft. The process can be employed iteratively whereby an optimized rakelet resulting from one multi-phase process is used as the nominal design for a subsequent, multi-phase process in which planforms, sizes, cant angles, toe angles, and the like are varied further to determine a rakelet configuration that may further increase endurance and range. The top two or more designs in any phase may be used in subsequent phases to determine the rakelet features that provide the maximum endurance and range for a particular aircraft. The disclosed methods and associated devices and their variations were described to best explain the principles of the invention and its practical applications to thereby enable other persons skilled in the art to make and use the invention in its various forms and with its various modifications as are suited to the particular uses contemplated. The scope of the invention is to be defined by the following claims.

What is claimed is:

1. A rakelet wingtip device for an aircraft, comprising:
a raked portion having an airfoil-shaped cross section, a proximal end, a distal end forming a raked portion distal chord, an upper surface, a lower surface, a leading edge, and a trailing edge, wherein the proximal end can be attached to a distal end of an aircraft wing and at least one of the leading edge and the trailing edge has a sweep angle greater than a sweep angle of a corresponding leading or trailing edge of the aircraft wing; and,
a winglet portion having an airfoil-shaped cross section, a proximal end, a distal end, an upper surface, a lower surface, a cant angle, and a toe-out angle, wherein the proximal end of the winglet portion is joined to the distal end of the raked portion along about 52% of the raked portion distal chord.

2. The rakelet of claim 1, wherein the winglet portion is attached to the wingtip chord of the raked portion at a cant angle of about 15°.

3. The rakelet of claim 1, wherein the winglet portion is attached to the wingtip chord of the raked portion at a toe-out angle of about −2°.

4. A rakelet wingtip device for an aircraft, comprising:
a raked portion having an airfoil-shaped cross section, a proximal end, a distal end forming a raked portion distal chord, an upper surface, a lower surface, a leading edge, and a trailing edge, wherein the proximal end can be attached to a distal end of an aircraft wing and at least one of the leading edge and the trailing edge has a sweep angle greater than a sweep angle of a corresponding leading or trailing edge of the aircraft wing;
a winglet portion having an airfoil-shaped cross section, a proximal end, a distal end, an upper surface, a lower surface, a cant angle, and a toe-out angle, wherein the proximal end of the winglet portion is joined to the distal end of the raked portion along less than 100% of the raked portion distal chord; and,
wherein the winglet portion is attached to the wingtip chord of the raked portion at a cant angle of about 15°.

5. The rakelet of claim 4, wherein the winglet portion is attached to the wingtip chord of the raked portion at a toe-out angle of about −2°.

6. A rakelet wingtip device for an aircraft, comprising:
a raked portion having an airfoil-shaped cross section, a proximal end, a distal end forming a raked portion distal chord, an upper surface, a lower surface, a leading edge, and a trailing edge, wherein the proximal end can be attached to a distal end of an aircraft wing and at least one of the leading edge and the trailing edge has a sweep angle greater than a sweep angle of a corresponding leading or trailing edge of the aircraft wing;
a winglet portion having an airfoil-shaped cross section, a proximal end, a distal end, an upper surface, a lower surface, a cant angle, and a toe-out angle, wherein the proximal end of the winglet portion is joined to the distal end of the raked portion along less than 100% of the raked portion distal chord; and,
wherein the winglet portion is attached to the wingtip chord of the raked portion at a toe-out angle of about −2°.

* * * * *